(12) United States Patent
Go

(10) Patent No.: US 10,682,683 B2
(45) Date of Patent: Jun. 16, 2020

(54) METHOD AND APPARATUS FOR FORGING HETEROGENEOUS MATERIAL

(71) Applicant: BUMCHUN PRECISION CO., LTD., Ansan (KR)

(72) Inventor: Si Jin Go, Seoul (KR)

(73) Assignee: BUMCHUN PRECISION CO., LTD., Ansan (KR)

( * ) Notice: Subject to any disclaimer, the term of this patent is extended or adjusted under 35 U.S.C. 154(b) by 596 days.

(21) Appl. No.: 15/312,609

(22) PCT Filed: May 20, 2015

(86) PCT No.: PCT/KR2015/005031
§ 371 (c)(1),
(2) Date: Nov. 18, 2016

(87) PCT Pub. No.: WO2015/178674
PCT Pub. Date: Nov. 26, 2015

(65) Prior Publication Data
US 2017/0080478 A1    Mar. 23, 2017

(30) Foreign Application Priority Data
May 20, 2014    (KR) .......................... 10-2014-0060197

(51) Int. Cl.
*B21J 9/02*        (2006.01)
*B21K 27/02*       (2006.01)
(Continued)

(52) U.S. Cl.
CPC . *B21J 9/02* (2013.01); *B21J 9/00* (2013.01); *B21K 25/00* (2013.01); *B21K 27/02* (2013.01); *B21K 27/06* (2013.01); *B23P 11/00* (2013.01)

(58) Field of Classification Search
CPC .... B21D 24/005; B21D 28/06; B21D 28/265; B21J 9/02; B21J 9/022; B21J 9/04; B21J 9/06; B21K 25/00; B21K 27/06
See application file for complete search history.

(56) References Cited

U.S. PATENT DOCUMENTS

2016/0257019 A1*    9/2016   Baist ..................... B21D 28/06

FOREIGN PATENT DOCUMENTS

JP       2001-001014 A       1/2001
KR       10-0417939 B1       2/2004
(Continued)

OTHER PUBLICATIONS

International Search Report for International Patent Application No. PCT/KR2015/005031 filed May 20, 2015.

*Primary Examiner* — Debra M Sullivan

(57) ABSTRACT

Disclosed are a method and an apparatus for forging dissimilar materials. The apparatus includes a press, a tray plate supply unit that supplies a tray plate by one pitch from one side to an opposite side, punching parts that continuously form material passing/fixing parts in the tray plate, a material plate supply unit that supplies a material plate to the upper sides of the material passing/fixing parts by one pitch, cutting/pressing parts that repeatedly cut the material plate introduced to upper sides of the material passing/fixing parts and fix the cut materials to the material passing/fixing parts after pressing the materials, pressing parts that press the moved materials, and extraction parts that separate and extract the formed materials.

22 Claims, 14 Drawing Sheets

(51) Int. Cl.
*B21K 27/06* (2006.01)
*B21J 9/00* (2006.01)
*B21K 25/00* (2006.01)
*B23P 11/00* (2006.01)

(56) References Cited

FOREIGN PATENT DOCUMENTS

| KR | 20-0440052 Y1 | 5/2008 |
| KR | 10-0836889 B1 | 6/2008 |
| KR | 10-2010-0100579 A | 9/2010 |
| KR | 10-2010-0131815 A | 12/2010 |
| KR | 10-2012-0056148 A | 6/2012 |

* cited by examiner

[Fig. 1]
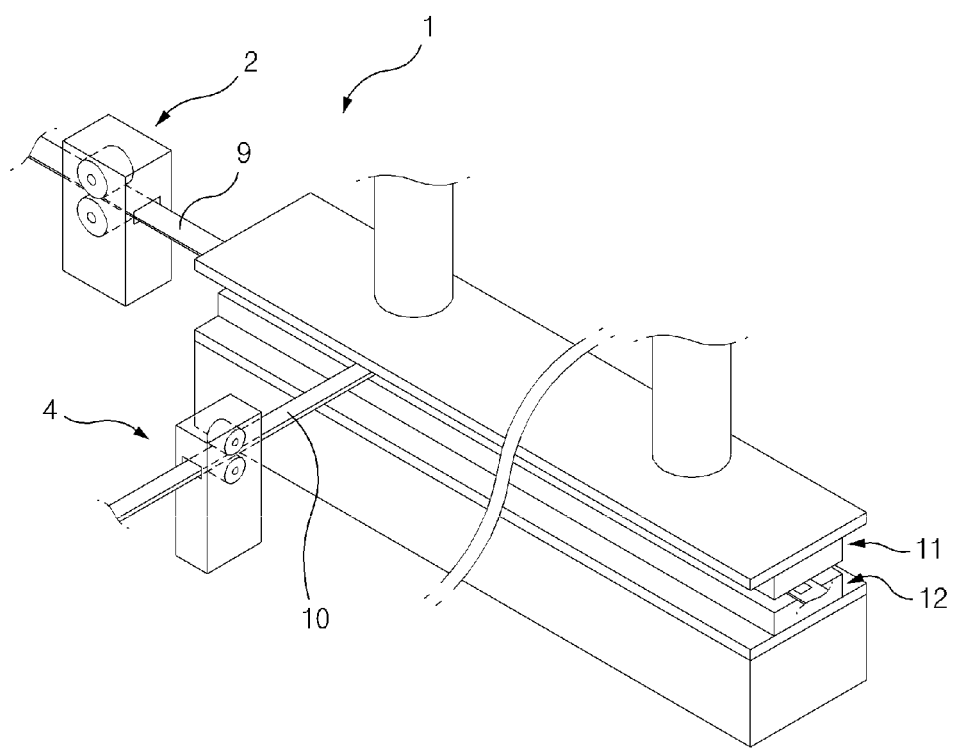

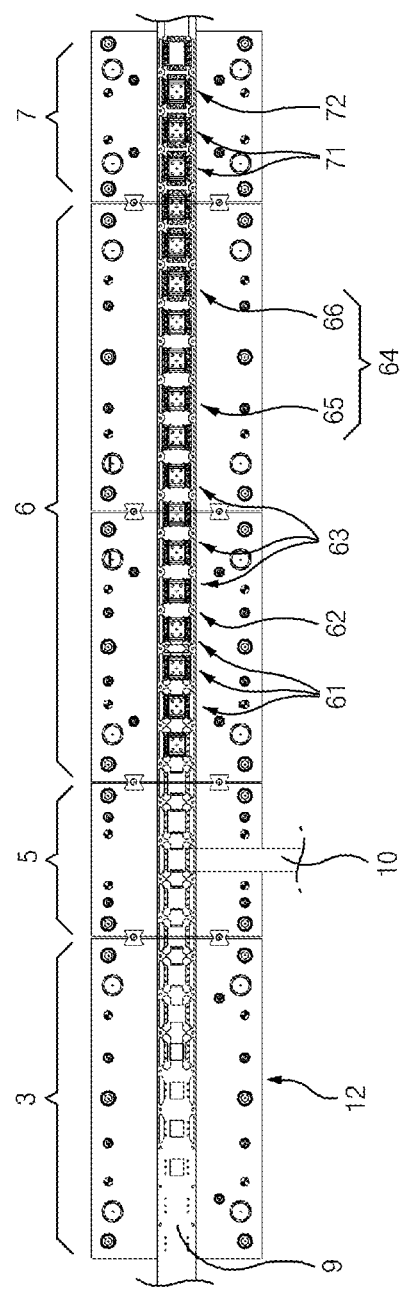

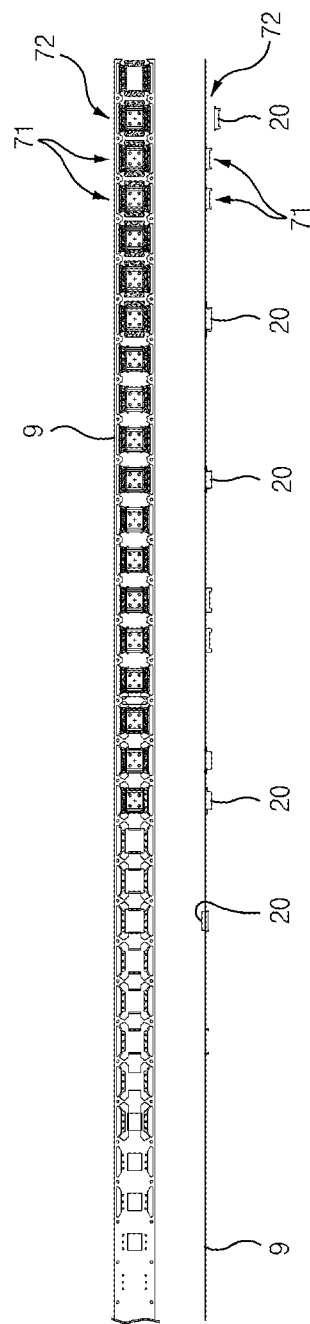
[Fig. 2b]

[Fig. 3]
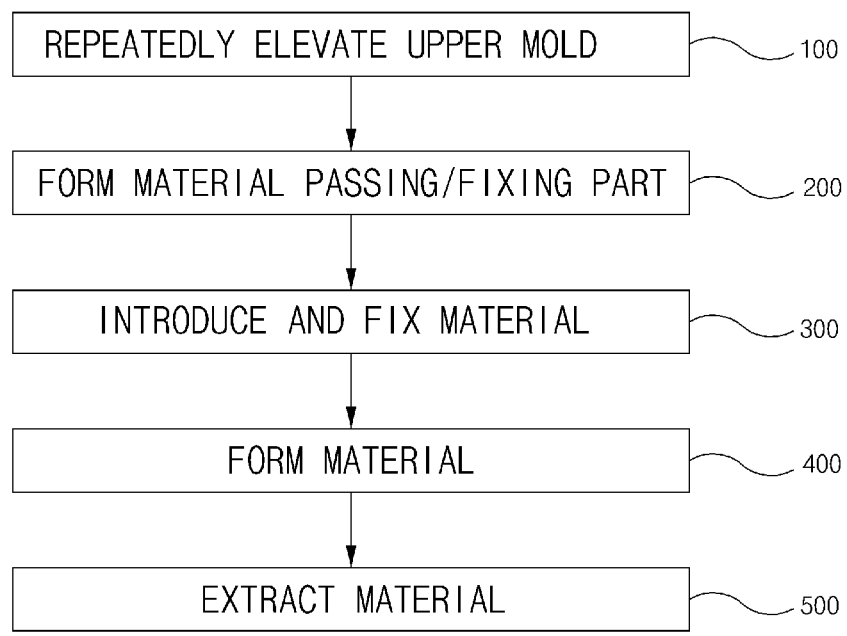

[Fig. 4a]
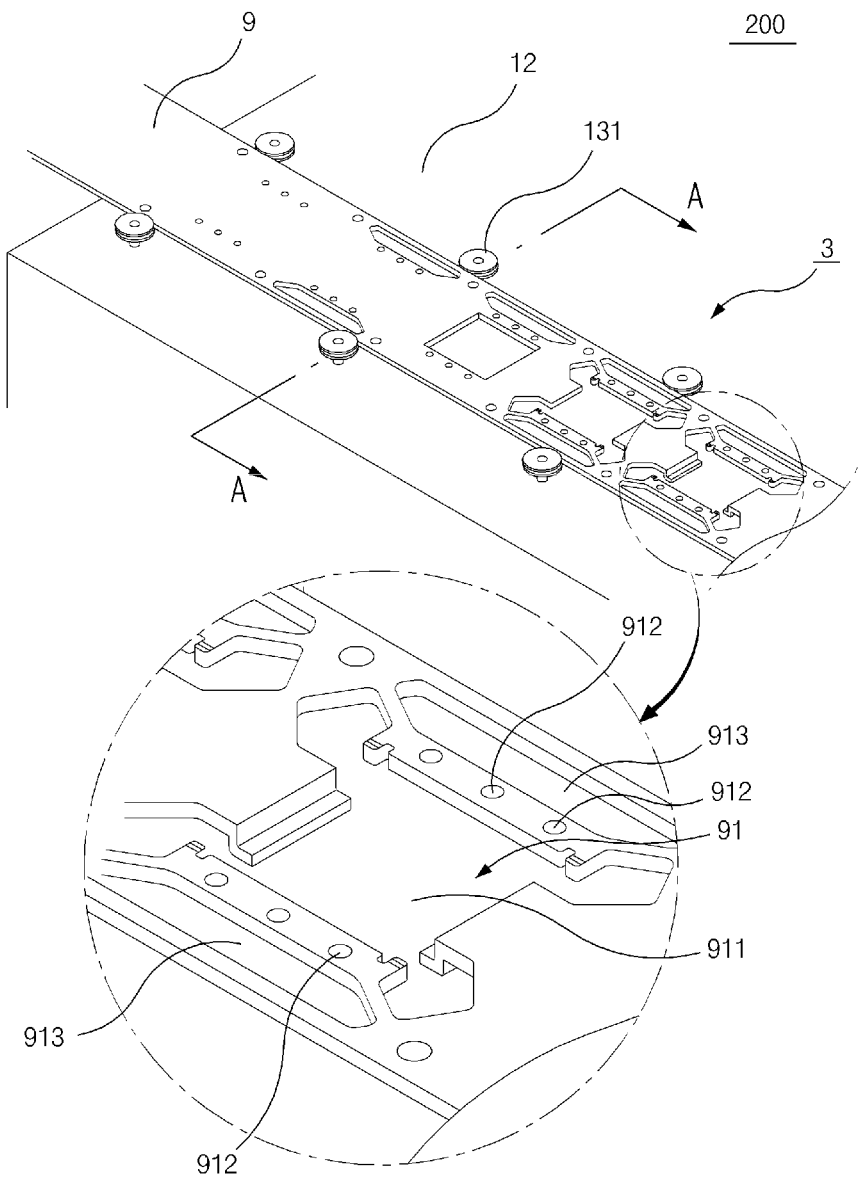

[Fig. 4b]
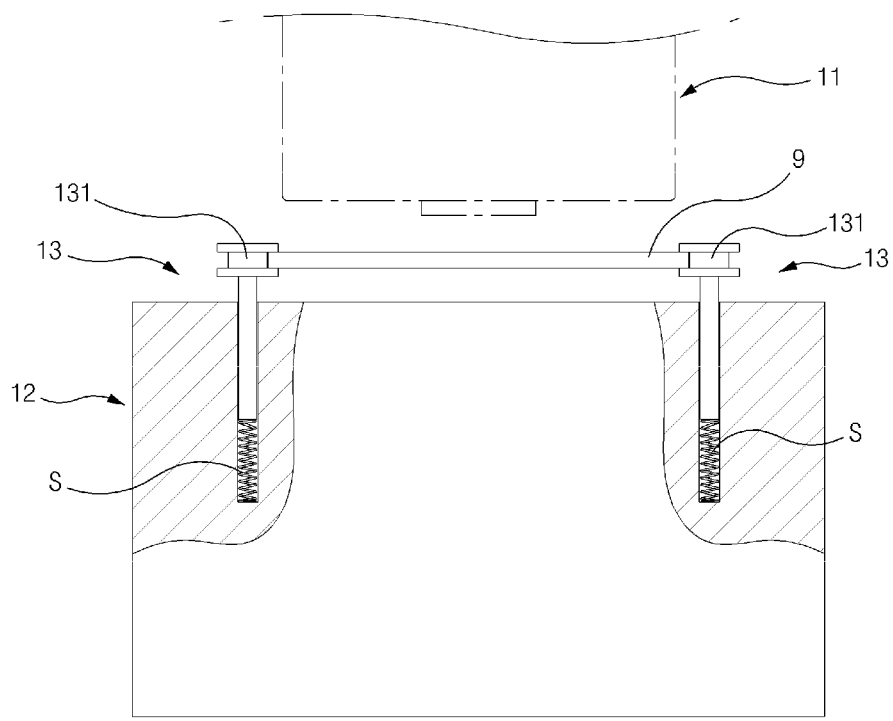

[Fig. 5]
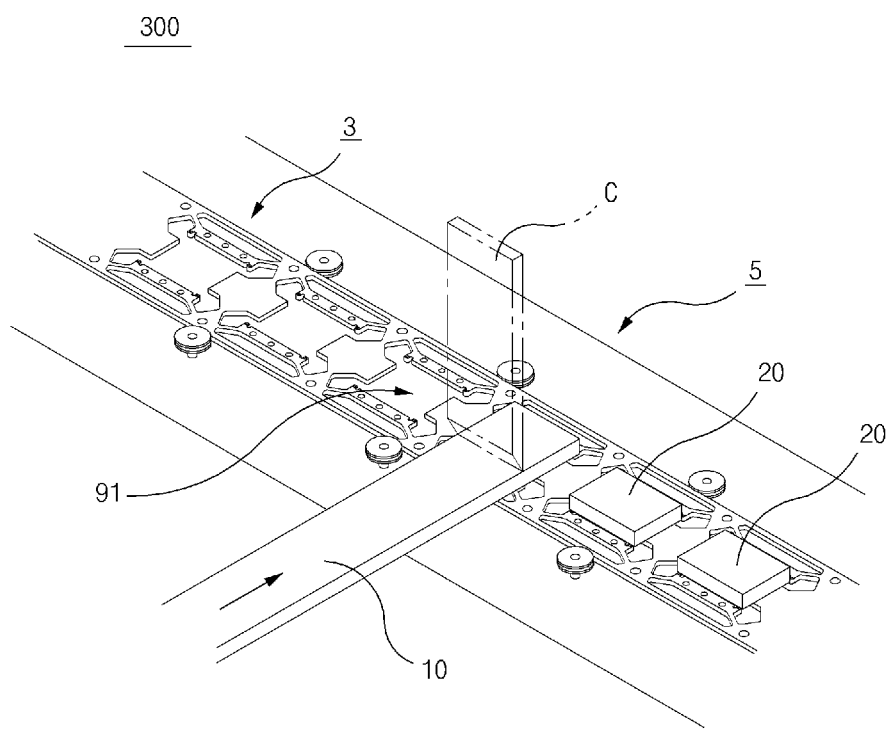

[Fig. 6]
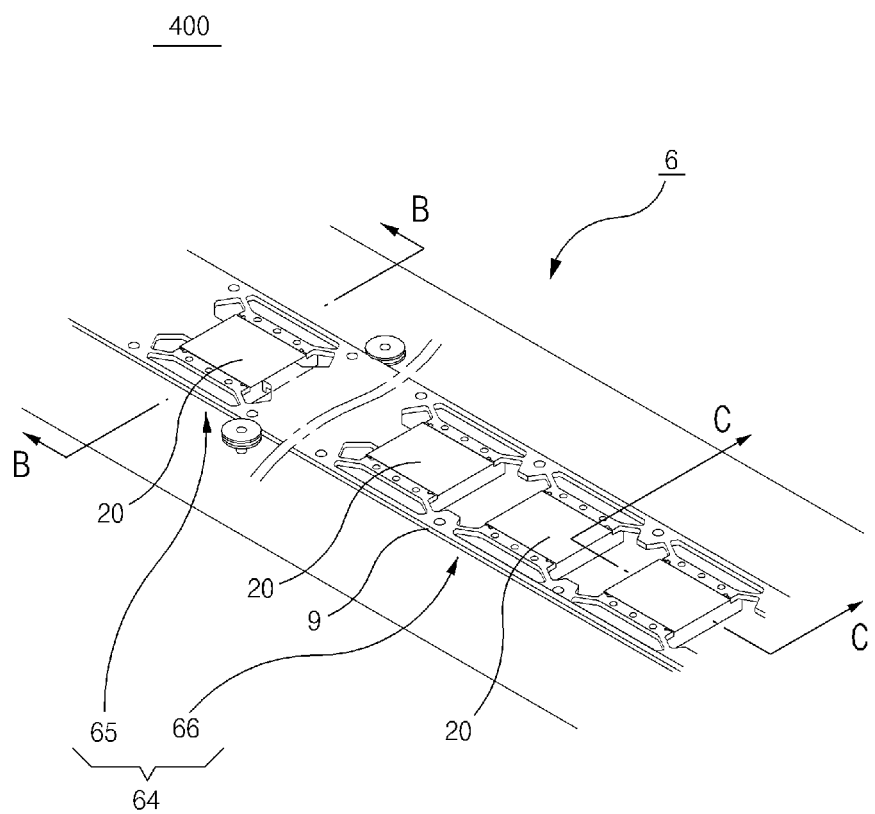

[Fig. 7a]
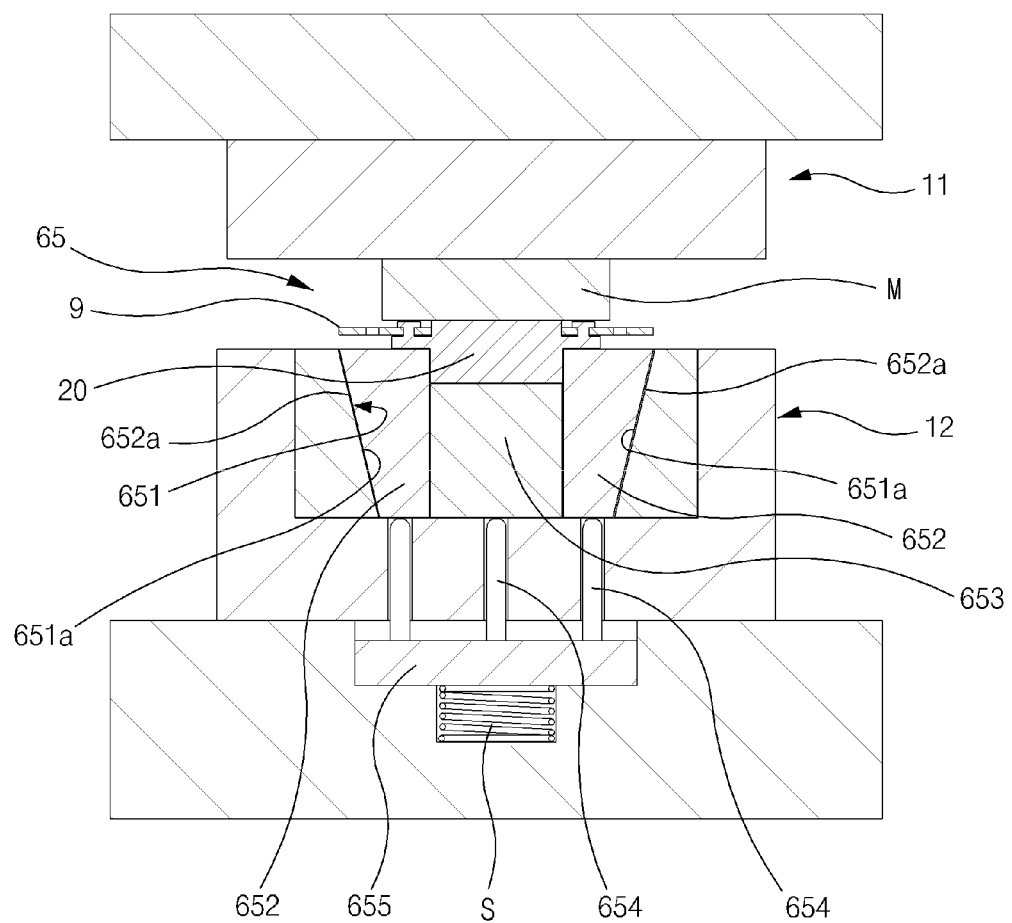

[Fig. 7b]
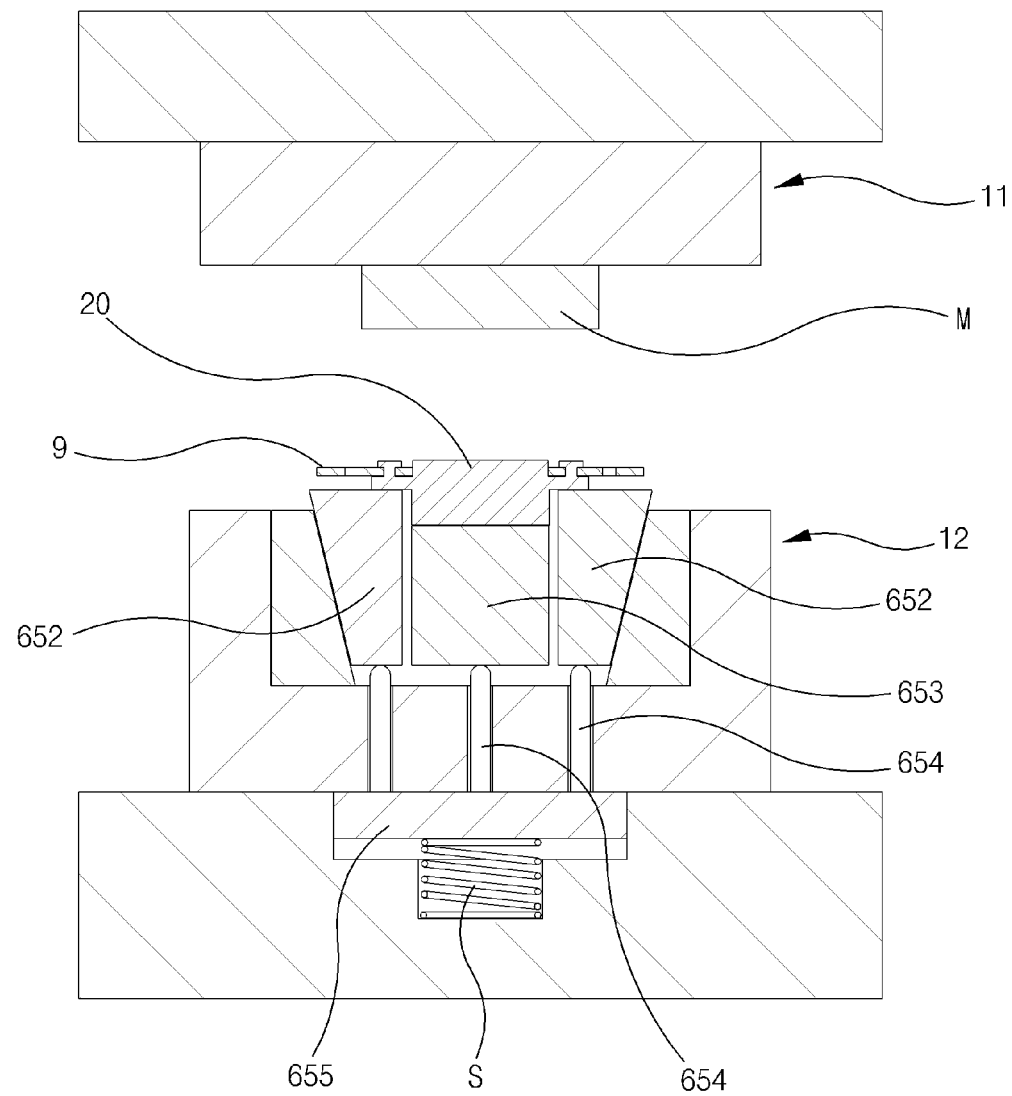

[Fig. 8a]
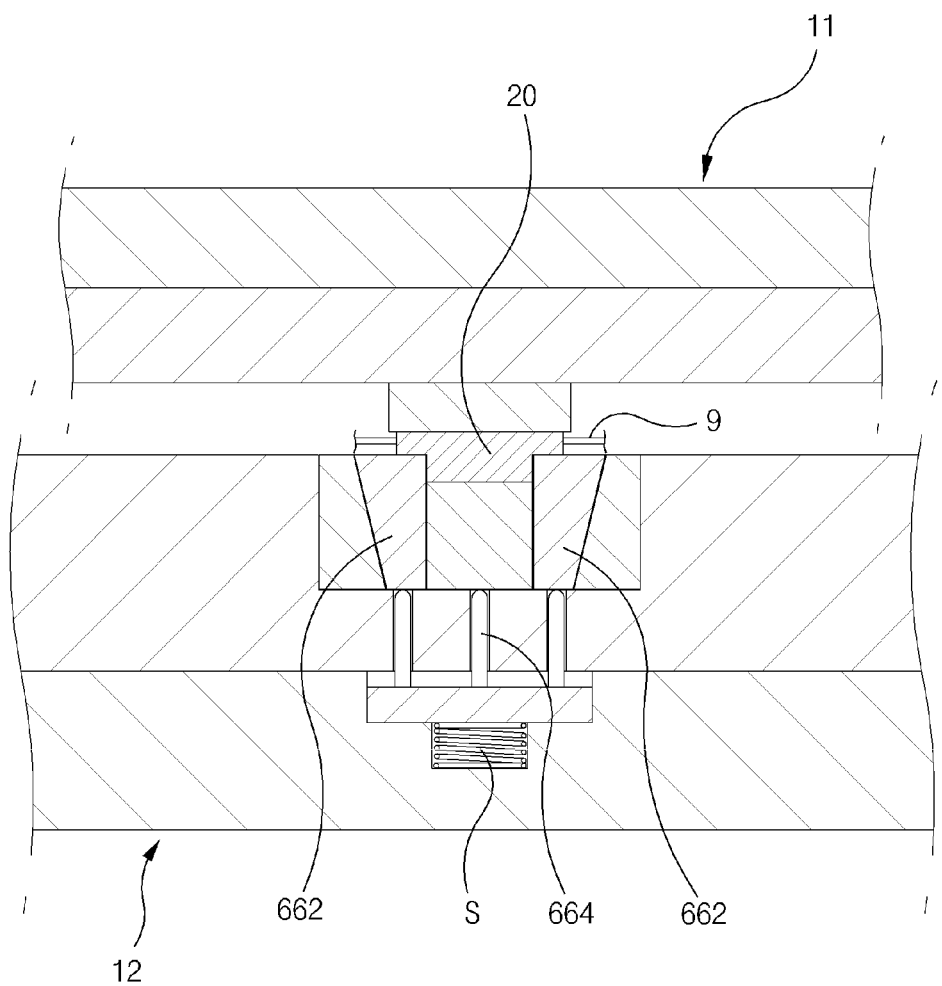

[Fig. 8b]
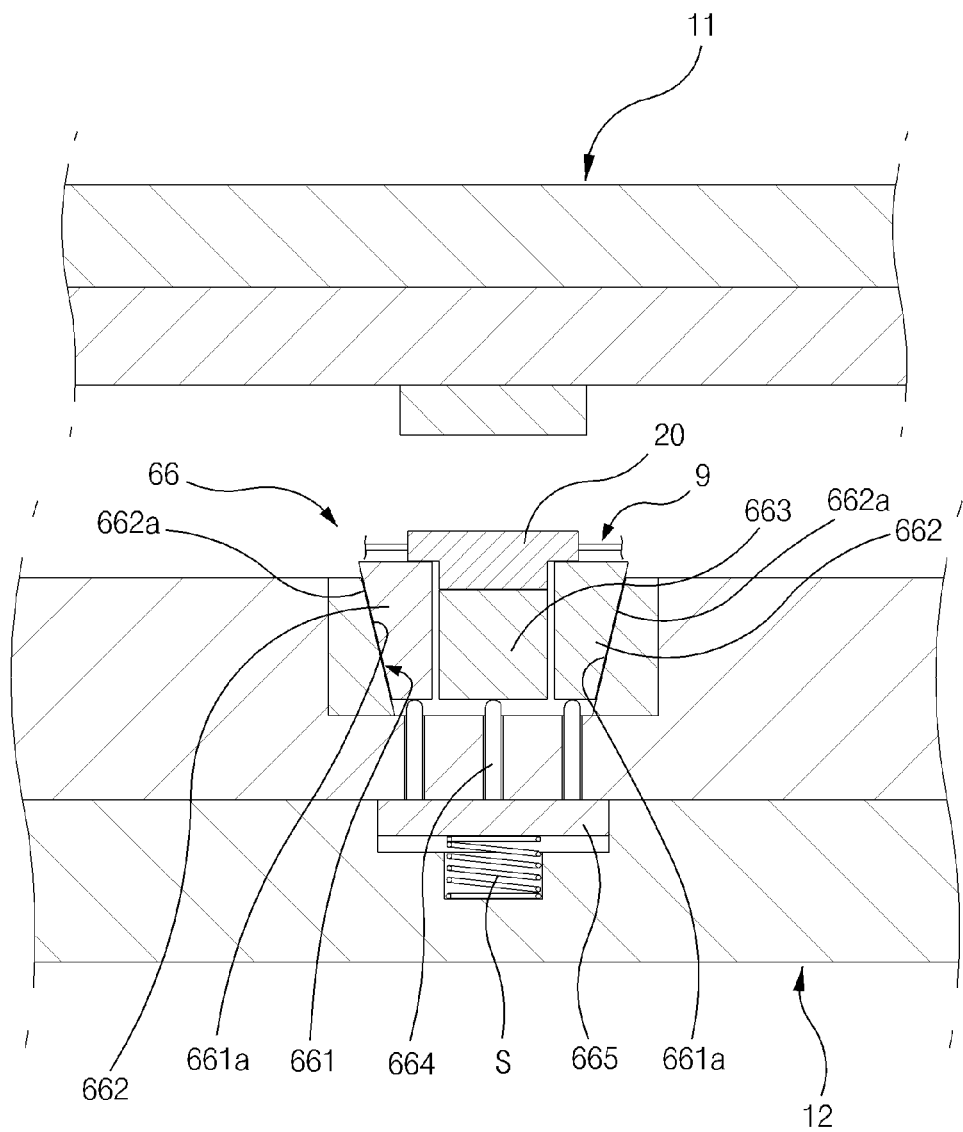

[Fig. 9a]
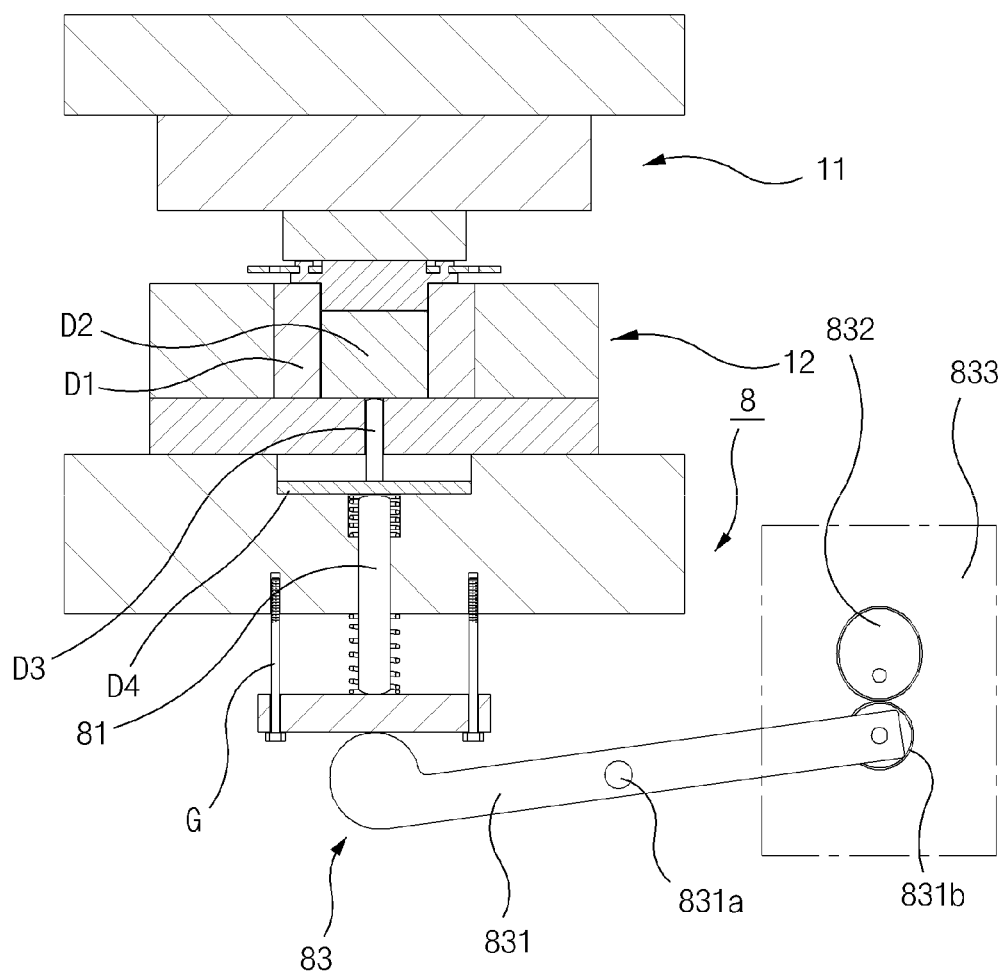

[Fig. 9b]
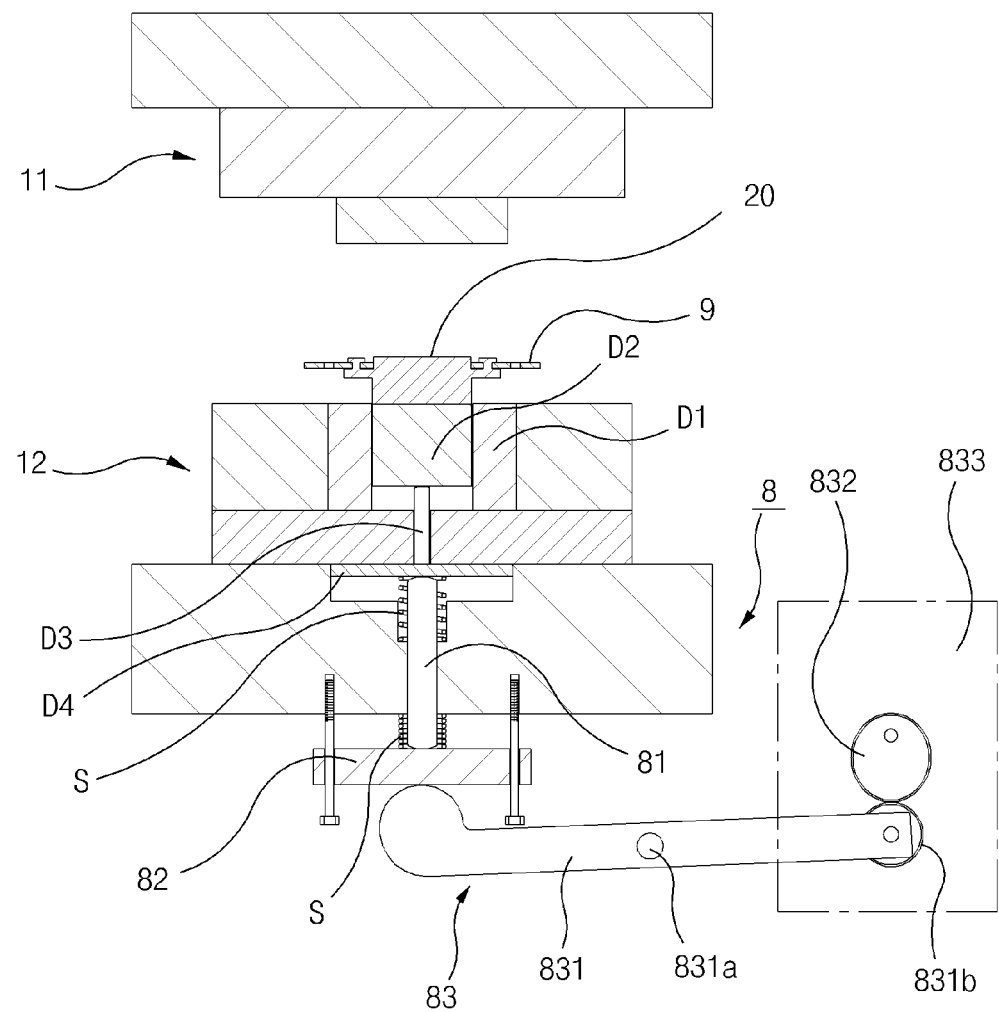

METHOD AND APPARATUS FOR FORGING HETEROGENEOUS MATERIAL

CROSS-REFERENCE TO RELATED APPLICATION

The present specification is a U.S. National Stage of International Patent Application No. PCT/KR2015/005031 filed May 20, 2015, which claims priority to and the benefit of Korean Patent Application No. 10-2014-0060197 filed in the Korean Intellectual Property Office on May 20, 2014, the entire contents of which are incorporated herein by reference.

TECHNICAL FIELD

Embodiments of the present invention described herein relate to a method and an apparatus for forging dissimilar materials, and more particularly to a method and an apparatus for forging dissimilar materials by which dissimilar materials may be sequentially pressed after being introduced into and fixed to a tray plate that is moved above a lower mold so that the productivity of the product may be improved by continuously introducing the material even only by supplying a material plate.

BACKGROUND ART

In general, forging is a forming method by which a material, such as iron or a non-iron metal, may be plasticized. Further, the forging operation of pressing a material is performed by a press machine (hereinafter, a press) including upper and lower molds.

Further, when a material is plasticized through forging according to the related art, a single forming method for forming a forged product by pressing a single material is known, and a sequential forming method of forming a forged product through sequential processing by introducing a long plate-shaped material into a progressive press.

Hereinafter, Korean Patent No. 0417939 entitled "Sequential Feeding/processing Apparatus (hereinafter, "a conventional sequential feeding/processing apparatus) will be described as an example of a conventional sequential forming method.

Accordingly, the conventional sequential feeding/processing apparatus is adapted to form forged products by sequentially processing a long target material, and is configured such that a plurality of processing units are arranged in a lengthwise feeding direction of the target material (for example, the material) in correspondence to a plurality of processing processes to sequential process the material through pitch feeding, the body being formed by a substrate, a support plate installed to be spaced apart from the substrate, a slider that is formed between the substrate and the support plate to be moved in a direction that is perpendicular to the substrate and the support plate. Further, the processing unit is implemented by a mechanical processing unit and the mechanical processing is continuously performed by controlling movement of the slider.

However, the conventional sequential feeding/processing apparatus is advantageous in manufacturing a product by pressing a thin plate having a low ductility. However, when a forged product is manufactured by introducing a thin plate of aluminum or copper having a high ductility into the conventional sequential feeding/processing apparatus, a feeding pitch of the material is changed by rapidly enlarging the volume of the material during the forging operation due to the excellent ductility. Therefore, the conventional sequential feeding/processing apparatus cannot sequentially process a material, such as aluminum or copper, which has an excellent ductility.

DETAILED DESCRIPTION OF THE INVENTION

Technical Problem

Embodiments of the present invention provide a method and an apparatus for forging dissimilar materials, by which dissimilar materials of excellent ductility may be sequentially pressed by introducing the materials into material passing/fixing parts to fix the materials to the material passing/fixing parts by continuously forming the material passing/fixing parts in a tray plate that is introduced to an upper side of a lower mold, and the materials may be continuously introduced even only by supplying a material plate.

Embodiments of the present invention also provides a method and an apparatus for forging dissimilar materials, by which dissimilar materials may be fixed to a tray plate more firmly by fixing front and rear sides of the dissimilar materials to the passing/fixing hole of a material passing/fixing part formed in the tray plate after the dissimilar materials pass through the passing/fixing hole, and manufacturing costs may be reduced when the materials are pressed by reducing the fixed volume of the high-priced dissimilar materials and maximizing use of the materials.

Embodiments of the present invention also provides a method and an apparatus for forging dissimilar materials, by which deformation of front and rear ends of a tray plate may be maximally reduced when a material is pressed, by further forming transversely long deformation preventing holes on front and rear sides of a material passing/fixing part of the tray plate so that the precision of pressing of the material may be further improved.

Embodiments of the present invention also provides a method and an apparatus for forging dissimilar materials, by which opposite sides of a material, as well as front, rear, upper, and lower sides of the material may be formed together and corners of the material may be rounded.

Embodiments of the present invention also provides a method and an apparatus for forging dissimilar materials, by which a material may be smoothly demolded upwards when the material is formed, by supplying a tray plate such that the tray plate is spaced apart from an upper surface of a lower mold.

Embodiments of the present invention also provides a method and an apparatus for forging dissimilar materials, by which a post-process, such as cutting, may be made unnecessary by cutting, separating, and extracting a circumference of a material when the finished material is extracted.

Embodiments of the present invention also provides a method and an apparatus for forging dissimilar materials, by which a pressed material may be demolded upwards more smoothly from a lower mold.

Technical Solution

In accordance with an aspect of the present invention, there is provided a method of forging dissimilar materials, the method including preparing a press including upper and lower molds, each of which has a punching part, a cutting/pressing part, a pressing part, and an extraction part that are sequentially provided from one side to an opposite side thereof, and repeatedly elevating the upper mold, continuously forming material passing/fixing parts in a tray plate through the punching part by supplying a tray plate by one pitch from one side to an opposite side towards an upper side of the lower mold whenever the upper mold is lifted, introducing material plates from a front side to upper sides of the material passing/fixing parts whenever the upper mold is lifted, repeatedly cutting the material plates through the cutting/pressing part, continuously introducing the cut materials to upper sides of the material passing/fixing parts, pressing the introduced material, and fixing the materials to the material passing/fixing parts, pressing the materials that are moved while being fixed to the tray plate, through the pressing part, and separating the materials that have been formed while being fixed to the tray plate, and extracting the separated materials to a lower side.

Each of the material passing/fixing part may include a central hole, and one or more passing/fixing holes that are formed on front and rear sides of the central hole such that the materials pass through the passing/fixing holes to be fixed to the passing/fixing holes.

Deformation preventing holes that extends transversely to prevent deformation of the tray plate may be further formed on the front and rear sides of the central hole.

The fixing of the materials may include in a state in which a rear side of the material plate is situated on the material passing/fixing part that has been moved to an opposite side to be stopped, cutting the rear side of the material by lowering the upper mold, and seating the cut material around an upper side of the central hole, and moving the material to an opposite side by one pitch after the material is seated, pressing front and rear sides of the material by lowering the upper mold, and fixing the front and rear sides of the material to the material passing/fixing hole after the material passes through the material passing/fixing hole.

The forming of the material may include pressing front, rear, upper, and lower sides of the material, sequentially cutting connection plates of opposite sides of the material after the front, rear, upper, and lower sides of the material are pressed, and discharging the connection plates to a lower side, and pressing opposite sides of the material the front, rear, upper, and lower sides of which have been pressed.

The material may be a metal, and the tray plate may be formed of a metal having a ductility that is smaller than a ductility of the material.

The material may be aluminum or copper, and the tray plate may be formed of iron or stainless steel.

In accordance with another aspect of the present invention, there is provided an apparatus for forging dissimilar materials, the apparatus including a press having upper and lower molds, a tray plate supply unit that supplies a tray plate by one pitch from one side to an opposite side towards an upper side of the lower mold, punching parts that are provided on sides of the upper and lower molds to continuously form material passing/fixing parts in the tray plate, a material plate supply unit that is provided in front of the press to supply a material plate to the upper sides of the material passing/fixing parts by one pitch, cutting/pressing parts that are provided in the upper and lower molds at opposite sides of the punching parts to repeatedly cut the material plate introduced to upper sides of the material passing/fixing parts and fix the cut materials to the material passing/fixing parts after pressing the materials, pressing parts that are provided in the upper and lower molds at opposite sides of the cutting/pressing parts to press the moved materials, and extraction parts that are provided in the upper and lower molds at opposite sides of the pressing parts to separate and extract the formed materials.

The press may further include an elevation guide part that supplies the tray plate such that the tray plate is elevated to be spaced apart from an upper surface of the lower mold.

The elevation guide part may include a plurality of elevation guide rolls which are formed on front and rear sides of the lower mold to be spaced apart from each other, which maintains a lifted location to be elevated through a spring below the elevation guide rolls, and each of which is attached to a front end or a rear end of the tray plate.

Each of the material passing/fixing parts may include a central hole, and one or more passing/fixing holes that are formed on front and rear sides of the central hole such that the materials pass through the passing/fixing holes to be fixed to the passing/fixing holes.

Deformation preventing holes that extend transversely to prevent deformation of the tray plate may be further formed on the front and rear sides of the central hole.

Each of the cutting/pressing parts may include a material cutting part that cuts the material through lowering of the upper mold, and a material pressing/fixing part that is provided on an opposite side of the material cutting part to press front and rear sides of the material and fixing the material to the passing/fixing holes formed on the front and rear sides of the material passing/fixing part after passing the material through the passing/fixing holes.

Each of the pressing parts may include one or more first pressing parts that are provided on one side of the pressing part to form the front, rear, and upper sides of the material, a connection plate cutting part that is provided on an opposite side of the first pressing parts to connect the material passing/fixing parts of the tray plate, and one or more second pressing parts that are provided on an opposite side of the connection plate cutting part to press opposite sides of the material.

The pressing part may further include a material forming/demolding part that is provided on an opposite side of the pressing part to finally press the material and demolding the material from the lower mold upwards by lifting the formed material through a resilient force of a spring.

The material forming/demolding part may include a first material demolding part that is provided on one side of the material forming/demolding part to separate and extract the material while forming front and rear sides of the material, and a second material demolding part that is provided on an opposite side of the first material demolding part to separate and extract the material while forming opposite sides of the material.

The first material demolding part may include a material pushing mold that is provided in the upper mold, a mold insertion groove that is defined in the lower mold that is situated below the material pushing mold by front and rear inclined surfaces such that front and rear sides of an upper portion thereof is wide and front and rear sides of a lower portion thereof is narrow, two front and rear elevation molds that are inserted into front and rear sides of the mold insertion groove, have attachment inclined surfaces attached to the front and rear inclined surfaces on the front and rear sides of each of the front and rear elevation molds, and have formed surfaces on facing surfaces thereof, a central mold that is provided between the front and rear elevation molds, a plurality of elevation pins that are formed at a lower portion of the mold insertion groove to pass through the mold insertion groove so as to push lower sides of the front and rear elevation molds and the central mold, and an elevation plate that is attached to lower sides of the elevation pins to normally push the elevation pins upwards through one or more springs.

The second material demolding part may include a material pushing mold that is provided in the upper mold, a forming mold insertion groove that is defined in the lower mold that is situated below the material pushing mold by opposite inclined surfaces such that opposite sides of an upper portion thereof is wide and opposite sides of a lower portion thereof is narrow, opposite elevation molds that are inserted into opposite sides of the forming mold insertion groove, have attachment inclined surfaces that are attached to front and rear inclined surfaces, and have formed surfaces on facing surfaces thereof, a central mold that is provided between the opposite elevation molds, a plurality of elevation pins that are formed at a lower portion of the forming mold insertion groove to pass through the mold insertion groove so as to push lower sides of the opposite elevation molds and the central mold, and an elevation plate that is attached to lower sides of the elevation pins to normally push the elevation pins upwards through one or more springs.

Each of the extraction parts may include a circumference cutting part that temporarily partially cuts a circumference of the material that has been pressed through lowering of the upper mold, and an extraction/discharge part that is provided on an opposite side of the circumference cutting part to separate and cut the material that has been finished through lowering of the upper mold and discharge the material to a lower side.

The circumference cutting part may include a lower mold that is inserted into the lower mold to form a forming part, into which the material is inserted, therein, a discharge mold that is provided in the interior of the forming part to be elevated, an elevation pin that is provided in the lower mold that is situated below the discharge mold to pass through the lower mold and push a lower end of the discharge mold upwards, an elevation plate that is provided in the interior of the lower mold to be elevated while being attached to a lower side of the elevation pin and to normally push the elevation pins upwards through one more more springs arranged below the elevation plate, and wherein the apparatus further includes an elevation plate striking unit that strikes a lower side of the elevation plate through driving of a motor to separate the material inserted into the forming part upwards.

The first pressing part or the second pressing part may include a lower mold that is inserted into the lower mold to form a forming part, into which the material is inserted, therein, a discharge mold that is provided in the interior of the forming part to be elevated, an elevation pin that is provided in the lower mold that is situated below the discharge mold to pass through the lower mold and push a lower end of the discharge mold upwards, an elevation plate that is provided in the interior of the lower mold to be elevated while being attached to a lower side of the elevation pin and to normally push the elevation pins upwards through one more more springs arranged below the elevation plate, and the apparatus further includes an elevation plate striking unit that strikes a lower side of the elevation plate through driving of a motor to separate the material inserted into the forming part upwards.

The elevation plate striking unit may include a striking elevation pin which passes from a center of a lower side of the spring downward, an upper portion of which passes through the spring, and a lower portion of which protrudes to a lower side of the lower mold, a striking plate that is provided below the striking elevation pin to be horizontally attached to the striking elevation pin such that the striking plate is elevated through a guide shaft around the striking plate, a spring that is resiliently installed in the striking elevation pin to be disposed between a lower surface of the lower mold and an upper side of the striking plate, and a striking part that strikes a lower surface of the striking plate through driving of a motor.

The striking part may include a working link a center of which is fixed to the press through a hinge shaft such that the striking part is rotated about the hinge shaft, one end of which is attached to a lower side of the striking plate, and an opposite end of which is provided with a rotary roll, and a rotary cam plate that is connected to a rotary shaft of the motor to be rotated and in which the rotary roll is attached to a circumference of the rotary cam plate, such that the striking plate is stricken by changing an angle of the working link.

The material may be a metal and the tray plate may be formed of a metal that has a ductility that is smaller than that of the material.

The material may be aluminum or copper, and the tray plate may be formed of iron or stainless steel.

Advantageous Effects of the Invention

According to the present invention, dissimilar materials may be sequentially pressed by introducing the dissimilar materials into the tray plate moved above the lower mold to fix the dissimilar materials to the tray plate, and the productivity of the product may be improved by continuously introducing the materials even only through supplying of the material plate.

Further, according to the present invention, a defect in which the materials deviates from the tray plate when the materials are pressed may be prevented in advance by fixing the front and rear sides of the dissimilar materials to the passing/fixing holes of the material passing/fixing parts formed in the tray plate after the dissimilar materials pass through the passing/fixing holes and fixing the dissimilar materials to the tray plate more firmly. Moreover, manufacturing costs may be reduced when the materials are pressed by reducing the fixed volume of the high-priced dissimilar material and maximizing use of the materials.

Further, according to the present invention, deformation of front and rear ends of a tray plate may be maximally reduced when a material is pressed, by further forming transversely long deformation preventing holes on front and rear sides of a material passing/fixing part of the tray plate so that the precision of pressing of the material may be further improved.

Further, according to the present invention, opposite sides of a material, as well as front, rear, upper, and lower sides of the material may be formed together and corners of the material may be rounded so that the design of the product may be diversified.

Further, according to the present invention, the apparatus may be restrained from being stopped in a process of performing a forming operation by supplying the tray plate while the tray plate is spaced apart from the upper surface of the lower mold and smoothly demolding the materials upwards when the material is pressed.

Further, according to the present invention, a post-process, such as cutting, may be made unnecessary by cutting, separating, extracting a circumference of the material when the finished material is extracted, so that costs due to the post-process may be reduced.

Further, according to the present invention, the apparatus may be restrained from being stopped in a process of performing a forming operation by demolding the pressed material from the lower mold upwards more smoothly.

DESCRIPTION OF THE DRAWINGS

FIG. 1 is a schematic perspective view illustrating a forging apparatus according to the present invention;

FIG. 2A illustrates an upper side of a lower mold;

FIG. 2B is a schematic view illustrating a process;

FIG. 3 is a process flowchart illustrating a forging method according to the present invention;

FIG. 4A is a schematic perspective view;

FIG. 4B is a sectional view taken along line A-A of FIG. 4A;

FIG. 5 is a schematic perspective view illustrating a material introducing/fixing operation 300 according to the present invention;

FIG. 6 is a schematic perspective view illustrating a material forming operation 400 according to the present invention;

FIG. 7A illustrates a pressed state;

FIG. 7B illustrates a demolded state of a material;

FIG. 8A illustrates a pressed state;

FIG. 8B illustrates a demolded state of a material;

FIG. 9A illustrates a pressed state; and

FIG. 9B illustrates a demolded state of a material.

MODE OF THE INVENTION

Hereinafter, exemplary embodiments of the present invention will be described in detail with reference to the accompanying drawings. However, it is noted that the present invention may be implemented in a plurality of different forms and is not limited to the embodiments.

FIG. 1 is a schematic perspective view illustrating a forging apparatus according to the present invention. FIG. 2A illustrates an upper side of a lower mold. FIG. 2B is a schematic view illustrating a process. FIG. 3 is a process flowchart illustrating a forging method according to the present invention. FIG. 4A is a schematic perspective view. FIG. 4B is a sectional view taken along line A-A of FIG. 4A. FIG. 5 is a schematic perspective view illustrating a material introducing/fixing operation 300 according to the present invention. FIG. 6 is a schematic perspective view illustrating a material forming operation 400 according to the present invention. FIG. 7A illustrates a pressed state. FIG. 7B illustrates a demolded state of a material. FIG. 8A illustrates a pressed state. FIG. 8B illustrates a demolded state of a material. FIG. 9A illustrates a pressed state. FIG. 9B illustrates a demolded state of a material.

As illustrated in the drawings, an apparatus for forging dissimilar materials according to the present invention includes a press 1 having upper and lower molds 11 and 12, and includes a tray plate supply unit 2 that supplies a tray plate 9 from one side (hereinafter, left sides of the drawings will be referred to as one side and right sides of the drawings that are opposite sides thereof will be referred to an opposite side) to an opposite side towards an upper side of the lower mold 12 by one pitch.

Further, the apparatus for forging dissimilar materials according to the present invention includes punching parts 3 that are provided on sides of the upper and lower molds 11 and 12 to continuously form material passing/fixing parts 91 in the tray plate 9, a material plate supply unit 4 that is provided in front of the press 1 to supply a material plate 10 to the upper sides of the material passing/fixing parts 91 by one pitch, cutting/pressing parts 5 that are provided in the upper and lower molds 11 and 12 at opposite sides of the punching parts 3 to repeatedly cut the material plate 10 introduced to upper sides of the material passing/fixing parts 91 and fix the cut materials to the material passing/fixing parts 91 after pressing the materials 20, pressing parts 6 that are provided in the upper and lower molds 11 and 12 at opposite sides of the cutting/pressing parts 5 to press the moved materials 20, and extraction parts 7 that are provided in the upper and lower molds 11 and 12 at opposite sides of the pressing parts 6 to separate and extract the formed materials 20.

Further, the press 1 that constitutes the present invention has upper and lower molds 11 and 12 and the upper mold 11 is elevated above the lower mold 12, and the configuration of elevating the upper mold 11 is well known in the art and accordingly, will not be described in detai. Moreover, the press 1 further include an elevation guide part 13 that supplies the tray plate 9 such that the tray plate 9 is elevated to be spaced apart from an upper surface of the lower mold 12.

The elevation guide part 13 includes a plurality of elevation guide rolls 131 which are formed on front and rear sides of the lower mold 12 to be spaced apart from each other, which maintains a lifted location to be elevated through a spring S below the elevation guide rolls 131, and each of which is attached to a front end or a rear end of the tray plate 9. That is, the tray plate 7 is moved to a lower side and is attached to an upper surface of the lower mold 12 when the upper mold 11 is lowered.

Accordingly, in the present invention, because the material 20 may be smoothly demolded while being pressed by supplying the tray plate 9 such that the tray plate 9 is spaced apart from an upper surface of the lower mold 12 through the elevation guide part 13 including the elevation guide rolls 131, the apparatus may be restrained from being stopped when the material 20 is pressed.

Further, as the tray plate supply unit 2 according to the present invention is provided on one side of the press 1 to be spaced apart from the press 1, it functions to supply the tray plate wound on a roller to an upper side of the lower mold 12 of the press 1. Further, the tray plate supply unit 2 having the above-mentioned function supplies the tray plate 9 from one side to an opposite side towards the lower mold 12 by one pitch through driving of two upper and lower interworking rollers. The tray plate supply unit 2 is well known, and a detailed description thereof will be omitted.

Further, the punching parts 3 according to the present invention are are provided on sides of the upper and lower molds 11 and 12 to continuously form material passing/fixing parts 91 in the tray plate 9. Each of the material passing/fixing parts 91 having the above-mentioned function includes a plurality of punches that are provided in the upper mold 11 at every pitch, and a plurality of forming holes that are provided in the lower mold 12 to discharge the plate that has been punched by the punches to a lower side.

Further, the material passing/fixing parts 91 formed by the punching parts 3 includes a central hole 911, and one or more passing/fixing holes 912 that are formed on the front and rear sides of the central hole 911 such that the material 20 passes through the passing/fixing holes 912 to be fixed. Moreover, the central hole 911 may have a rectangular or circular shape, and the drawings illustrate that a rectangular hole is formed.

Deformation preventing holes 913 that extend transversely to prevent deformation of the tray plate 9 are further formed on the front and rear sides of the central hole 911. Accordingly, as deformation of the front and rear ends of the tray plate 9 may be restrained when the material 20 is pressed by the deformation preventing holes 913 formed on the front and rear sides of the material passing/fixing parts 91 of the tray plate 9, the precision of the pressing of the material 20 may be further improved.

Further, as the material plate supply unit 4 according to the present invention is spaced apart from the front side of the press 1, it functions to supply the material plate 10 wound on a roller to upper sides of the material passing/fixing parts 91. Further, the material plate supply unit 4 having the above-mentioned function supplies the material plate 10 from a front side towards the upper sides of the material passing/fixing parts 91 by one pitch through driving of two upper and lower interworking rollers. The material plate supply unit 4 is well known, and a detailed description thereof will be omitted.

Further, the cutting/pressing parts 5 according to the present invention functions to repeatedly cut the material plate 10 that is introduced to upper sides of the material passing/fixing parts 91 and press the cut materials 20 to fix the materials 20 to the material passing/fixing parts 91.

It is preferable that each of the cutting/pressing parts 5 having the above-mentioned function include a material cutting part that cuts the material 20 through lowering of the upper mold 11, and a material pressing/fixing part that is provided on an opposite side of the material cutting part to press front and rear sides of the material 20 and fixing the material to the passing/fixing holes 912 formed on the front and rear sides of the material passing/fixing part 91 after passing the material through the passing/fixing holes 912. Further, the material cutting part includes a vertical cutter C that is mounted on the upper mold 11 to cut a rear side of the material plate 10 through lifting of the upper mold 11.

Further, it is preferable that the material 20 be a metal and the tray plate 9 be formed of a metal that has a ductility that is smaller than that of the material 20. Moreover, the material 20 may be aluminum or copper, and the tray plate 9 may be formed of iron or stainless steel.

Accordingly, the dissimilar material 20 may be fixed to the tray plate 9 more firmly by fixing the front and rear sides of the dissimilar material 20 to a passing/fixing hole 912 of the material passing/fixing part 91 formed in the tray plate 9 such that the dissimilar material 20 passes through the passing/fixing hole 912, through the material pressing/fixing part. Therefore, the present invention also prevents a defect in which the material 20 deviates from the tray plate 9 when the material 20 is pressed. Further, according to the present invention, as only the front and rear sides of the dissimilar material 20 is fixed to the tray plate 9, manufacturing costs may be reduced when the material 20 is pressed by maximally using the material 20 while minimizing the fixed volume of the high-priced dissimilar material 20.

Further, the pressing parts 6 according to the present invention are provided in the upper and lower molds at opposite sides of the cutting/pressing parts to press the moved materials. Further, each of the pressing parts 6 having the above-mentioned function includes one or more first pressing parts 61 that are provided on one side of the pressing part 6 to form the front, rear, and upper sides of the material 20, a connection plate cutting part 62 that is provided on an opposite side of the first pressing parts 61 to connect the material passing/fixing parts 91 of the tray plate 9, and one or more second pressing parts 63 that are provided on an opposite side of the connection plate cutting part 62 to press opposite sides of the material 20.

Further, each of the first pressing part 61 and the second pressing part 62 includes upper and lower forming molds that are formed in the upper and lower mold 11 and 12. Moreover, the connection plate cutting part 62 includes a cutter part (not illustrated) that is provided in the upper mold 11. Accordingly, in the present invention, opposite sides of the material 20, as well as the front, rear, upper, and lower sides of the material 20 may be formed together through the first pressing part 61 and the second pressing part 63, and the design of the product may be diversified by rounding corners of the material 20.

A material forming/demolding part 64 that finally forms the material 20 and extracts the formed material 20 may be further provided on an opposite side of the pressing part 6. Further, the material forming/demolding part 64 includes a first material demolding part 65 that is provided on one side of the material forming/demolding part 64 to separate and extract the material 20 while forming front and rear sides of the material 20, and a second material demolding part 66 that is provided on an opposite side of the first material demolding part 65 to separate and extract the material 20 while forming opposite sides of the material 20.

It is preferable that the first material demolding part 65 include a material pushing mold M that is provided in the upper mold 11 such that the pressed material 20 may be demolded upwards from the lower mold 12 more smoothly, a mold insertion groove 651 that is defined in the lower mold 12 that is situated below the material pushing mold M by front and rear inclined surfaces 651a such that front and rear sides of an upper portion thereof is wide and front and rear sides of a lower portion thereof is narrow, two front and rear elevation molds 652 that are inserted into front and rear sides of the mold insertion groove 651, have attachment inclined surfaces 652a attached to the front and rear inclined surfaces 651a on the front and rear sides of each of the front and rear elevation molds 652, and have formed surfaces on facing surfaces thereof, a central mold 653 that is provided between the front and rear elevation molds 652, a plurality of elevation pins 654 that are formed at a lower portion of the mold insertion groove 651 to pass through the mold insertion groove 651 so as to push lower sides of the front and rear elevation molds 652 and the central mold 653, and an elevation plate 655 that is attached to lower sides of the elevation pins 654 to normally push the elevation pins 654 upwards through one or more springs S.

Accordingly, when the materials 20 that are sequentially located on the lower mold 12 through the first material demolding part 65 is pressed, a formed material that is inserted into the pair of elevation molds 652 is formed below the material by lowering the material pushing mold 21 as the upper mold 11 of the press 1 is lowered first. Next, if the material pushing mold M is lifted by lifting the upper mold 11 after the formed material inserted into the pair of elevation molds 662 is pressed, the elevation plate 654 is lifted by extending the spring S arranged at a lowermost side of the first material demolding part 65 by using a resilient force. Next, the two elevation molds 652 and the central mold 653 are lifted upwards as the lifted elevation plate 655 pushes the plurality of elevation pins 654 that pushes lower sides of the two elevation molds 652 and the central mold 653 upwards. Further, then, the two elevation molds 652 are lifted while a gap between the two elevation molds 652 is widened, by attaching the attachment inclined surfaces 652a formed the elevation molds 652 to the inclined surfaces 651a of the mold insertion groove. Next, in this way, if the gap between the two elevation molds 652 is widened, the pressed formed material is lifted and demolded from the space between the two elevation molds 652 and the material is smoothly demolded from the lower mold 12 as the material is moved from the lower mold 12 upwards.

It is preferable that the second material demolding part 66 include a material pushing mold M that is provided in the upper mold 11, a forming mold insertion groove 661 that is defined in the lower mold 12 that is situated below the material pushing mold M by opposite inclined surfaces 661a such that opposite sides of an upper portion thereof is wide and opposite sides of a lower portion thereof is narrow, opposite elevation molds 662 that are inserted into opposite sides of the forming mold insertion groove 661, have attachment inclined surfaces 662a that are attached to front and rear inclined surfaces, and have formed surfaces on facing surfaces thereof, a central mold 663 that is provided between the opposite elevation molds 662, a plurality of elevation pins 664 that are formed at a lower portion of the forming mold insertion groove 661 to pass through the mold insertion groove 661 so as to push lower sides of the opposite elevation molds 662 and the central mold 663, and an elevation plate 665 that is attached to lower sides of the elevation pins 664 to normally push the elevation pins 664 upwards through one or more springs S.

Accordingly, when the materials 20 that are sequentially located on the lower mold 12 through the second material demolding part 66 is pressed, a formed material that is inserted into the pair of elevation molds 652 is formed below the material by lowering the material pushing mold 21 as the upper mold 11 of the press 1 is lowered first. Next, if the material pushing mold M is lifted by lifting the upper mold 11 after the formed material inserted into the pair of elevation molds 662 is pressed, the elevation plate 664 is lifted by extending the spring S arranged at a lowermost side of the first material demolding part 66 by using a resilient force. Next, the two elevation molds 665 and the central mold 662 are lifted upwards as the lifted elevation plate 663 pushes the plurality of elevation pins 664 that pushes lower sides of the two elevation molds 662 and the central mold 663 upwards. Further, then, the two elevation molds 662 are lifted while a gap between the two elevation molds 662 is widened, by attaching the attachment inclined surfaces 662a formed the elevation molds 652 to the inclined surfaces 661a of the mold insertion groove. Next, in this way, if the gap between the two elevation molds 662 is widened, the pressed formed material is lifted and demolded from the space between the two elevation molds 652 and the material is smoothly demolded from the lower mold 12 as the material 20 is moved from the lower mold 12 upwards.

Further, the extraction parts 7 according to the present invention are provided in the upper and lower molds 11 and 12 to be arranged on an opposite side of the pressing part 6 to separate and extract the formed material 20. Further, each of the extraction parts 7 having the above-mentioned function includes a circumference cutting part 71 that temporarily partially cuts a circumference of the material 20 that has been pressed through lowering of the upper mold 11, and an extraction/discharge part 72 that is provided on an opposite side of the circumference cutting part 71 to separate and cut the material 20 that has been finished through lowering of the upper mold 11 and discharge the material 20 to a lower side.

Accordingly, in the present invention, as a post-process, such as cutting, is made unnecessary by cutting a circumference of the material 20 to separate and extract the circumference of the material 20 when the finished material 20 is extracted, costs due to the progress of the post-process may be reduced.

Meanwhile, the first pressing part 61 or the second pressing part 62 includes a lower mold part D1 that is inserted into the lower mold 12 to form a forming part, into which the material 20 is inserted, therein, a discharge mold D2 that is provided in the interior of the forming part to be elevated, an elevation pin D3 that is provided in the lower mold 12 that is situated below the discharge mold D2 to pass through the lower mold 12 and push a lower end of the discharge mold D2 upwards, an elevation plate D4 that is provided in the interior of the lower mold 12 to be elevated while being attached to a lower side of the elevation pin D3 and to normally push the elevation pins D3 upwards through one more more springs arranged below the elevation plate D4, and the apparatus further includes an elevation plate striking unit 8 that strikes a lower side of the elevation plate D4 through driving of a motor to separate the material 20 inserted into the forming part upwards.

It is preferable that the elevation plate striking unit 8 include a striking elevation pin 81 which passes from a center of a lower side of the spring S downwards, an upper portion of which passes through the spring S, and a lower portion of which protrudes to a lower side of the lower mold 12, a striking plate 82 that is provided below the striking elevation pin 81 to be horizontally attached to the striking elevation pin 81 such that the striking plate 82 is elevated through a guide shaft G around the striking plate 82, a spring S that is resiliently installed in the striking elevation pin 81 to be disposed between a lower surface of the lower mold 12 and an upper side of the striking plate 82, and a striking part 83 that strikes a lower surface of the striking plate 82 through driving of a motor 833.

Further, the striking part 83 includes a working link 831 a center of which is fixed to the press 1 through a hinge shaft 831a such that the striking part 83 is rotated about the hinge shaft 831a, one end of which is attached to a lower side of the striking plate 82, and an opposite end of which is provided with a rotary roll 831b, and a rotary cam plate 832 that is connected to a rotary shaft of the motor 833 to be rotated and in which the rotary roll 831b is attached to a circumference of the rotary cam plate 832, such that the striking plate 82 is stricken by changing an angle of the working link 831.

Accordingly, in the present invention, after the material 20 inserted into the forming hole of the lower mold part D1, the striking plate 82 is stricken by driving the motor 833 and instantaneously lifting one end of the working link 831 while lifting the upper mold 11 and lifting the material pushing mold, through the elevation plate striking unit 8.

Then, as the striking elevation pin 81 is instantaneously lifted while the striking plate 82 is lifted, the elevation plate D4, the elevation pin D3, and the discharge mold D2 are instantaneously lifted, so that the material 20 is pressed and the material 20 inserted into the forming hole of the lower mold part D1 is demolded to an upper side of the lower mold.

Accordingly, in the present invention, as the pressed material 20 may be demolded to an upper side of the lower mold 12 more smoothly through the elevation plate striking unit 8, the apparatus may be restrained from being stopped in the process of pressing the material 20.

Hereinafter, a method of forging a dissimilar material according to the present invention will be described.

As illustrated in FIGS. 1 to 9, the method of forging a dissimilar material according to the present invention may be performed through the above-described forming apparatus. Accordingly, first, the method of forging a dissimilar material according to the present invention performs an operation 100 of preparing a press 1 including upper and lower molds 11 and 12, each of which has a punching part 3, a cutting/pressing part 5, a pressing part 6, and an extraction part 7 that are sequentially provided from one side to an opposite side thereof, and repeatedly elevating the upper mold 11.

Next, a material passing/fixing part forming operation 200 of continuously forming material passing/fixing parts 91 in a tray plate 9 through the punching part 3 by supplying a tray plate 9 by one pitch from one side to an opposite side towards an upper side of the lower mold 12 whenever the upper mold 11 is lifted is performed.

Further, each of the material passing/fixing parts 91 includes a central hole 911, and one or more passing/fixing holes 912 that are formed on the front and rear sides of the central hole 911 such that the material 20 passes through the passing/fixing holes 912 to be fixed. Moreover, the central hole 911 may have a rectangular or circular shape, and the drawings illustrate that a rectangular hole is formed.

Deformation preventing holes 913 that extend transversely to prevent deformation of the tray plate 9 are further formed on the front and rear sides of the central hole 911. Accordingly, as deformation of the front and rear ends of the tray plate 9 may be restrained when the material 20 is pressed by the deformation preventing holes 913 formed on the front and rear sides of the material passing/fixing parts 91 of the tray plate 9, the precision of the pressing of the material 20 may be further improved.

Next a material introducing/fixing operation 300 of introducing material plates 10 from a front side to upper sides of the material passing/fixing parts 91 whenever the upper mold 11 is lifted, repeatedly cutting the material plates 10 through the cutting/pressing part 5, continuously introducing the cut materials 20 to upper sides of the material passing/fixing parts 91, pressing the introduced material 20, and fixing the materials to the material passing/fixing parts 91 is performed.

Further, it is preferable that the material 20 be a metal and the tray plate 9 be formed of a metal that has a ductility that is smaller than that of the material 20. Moreover, the material 20 may be aluminum or copper, and the tray plate 9 may be formed of iron or stainless steel.

It is preferable that the material introducing/fixing operation 300 include a process of, in a state in which a rear side of the material plate 10 is situated on the material passing/fixing part 91 that has been moved to an opposite side to be stopped, cutting the rear side of the material 20 by lowering the upper mold 12, and seating the cut material 20 around an upper side of the central hole 911, and a process of moving the material 20 to an opposite side by one pitch after the material 20 is seated, pressing front and rear sides of the material 20 by lowering the upper mold 11, and fixing the front and rear sides of the material 20 to the material passing/fixing hole 912 after the material 20 passes through the material passing/fixing hole 912. That is, in the process of passing the front and rear sides of the material 20 through the material passing/fixing hole 912 to fix the material 20, the material 20 may be fixed after passing through the passing/fixing hole 912 from a lower side to an upper side or may be fixed after the material passes through the passing/fixing hole 912 from an upper side to a lower side, and the accompanying drawings illustrate that the material 20 passes through passing/fixing hole 912 from a lower side to an upper side. Accordingly, the dissimilar material 20 may be fixed to the tray plate 9 more firmly by fixing the front and rear sides of the dissimilar material 20 to a passing/fixing hole 912 of the material passing/fixing part 91 formed in the tray plate 9 such that the dissimilar material 20 passes through the passing/fixing hole 912.

Next, a material forming operation 400 of pressing the material 20 that is moved while being fixed to the tray plate 9 through the pressing part 6 is performed.

It is preferable that the material forming operation 400 include a process of pressing opposite sides of the material 20, as well as front, rear, upper, and lower sides of the material 20, a process of sequentially cutting connection plates P of opposite sides of the material 20 after the front, rear, upper, and lower sides of the material 20 are pressed, and a process of discharging the connection plates P to a lower side, and pressing opposite sides of the material 20 the front, rear, upper, and lower sides of which have been pressed. Accordingly, in the present invention, because the front, rear, upper, and lower sides of the material 20 together with the opposite sides of the material 20 may be formed and the corners of the material 20 may be also rounded, the design of the product may be diversified.

Next, the process of pressing the dissimilar material 20 through the tray plate 9 may be completed by performing a material extracting operation 500 of separating the material 20 that has been formed while being fixed to the tray plate 9, and extracting the separated material 20 to a lower side. Accordingly, in the present invention, as a post-process, such as cutting, is made unnecessary by cutting a circumference of the material 20 to separate and extract the circumference of the material 20 when the finished material 20 is extracted through the extraction part 7, costs due to the progress of the post-process may be reduced.

Accordingly, the present invention is an available invention by which the dissimilar material 20 is introduced into and fixed to the tray plate 9 moved from an upper side of the lower mold 12, and is an available invention that may further improve productivity of the product by continuously introducing the material 20 even only by supplying the material plate 10.

Although the exemplary embodiments of the present invention have been described, various changes, modifications, and equivalents may be made. It is clear that the present invention may be applied in the same way by properly modifying the embodiments. Accordingly, the above description does not intend to limit the scope of the present invention that is determined by the limitations of the claims.

Meanwhile, although the detailed embodiments have been described, it is apparent that various modifications may be made without departing from the scope of the present invention.

DESCRIPTION OF MAIN PARTS

1: Press
11: Upper mold
12: Lower mold
13: Elevation guide part
131: Elevation guide roll
2: Tray plate supply unit
3: Punching part
4: Material plate supply unit
5: Cutting/pressing part
6: Pressing part
61: First pressing part
62: Connection plate cutting part
63: Second pressing part
64: Material forming/demolding part
65: First material demolding part 651: Mold insertion groove, 651a: Inclined surface
652: Elevation mold, 652a: Attachment inclined surface
653: Central mold, 654: Elevation pin
655: Elevation plate
66: Second material demolding part
661: Mold insertion groove, 661a: Inclined surface
662: Elevation mold, 662a: Attachment inclined surface
663: Central mold, 664: Elevation pin
665: Elevation plate
7: Extraction part
71: Circumference cutting part
72: Extraction/discharge part
8: Elevation plate striking unit
81: Striking elevation pin
82: Striking plate
83: Striking part
831: Working link, 831a: Hinge shaft, 831b: Rotary roll
832: Rotary cam plate, 833: Motor
9: Tray plate
91: Material passing/fixing part
911: Central hole, 912: Passing/fixing hole, 913: Deformation preventing hole
D1: Lower mold part, D2: Discharge mold, D3: Elevation pin, D4: Elevation plate, S: Spring

The invention claimed is:

1. A method of forging dissimilar materials, the method comprising:
    preparing a press comprising upper and lower molds, each of which has a punching part, a cutting/pressing part, a pressing part, and an extraction part that are sequentially provided from one side to an opposite side thereof, and repeatedly elevating the upper mold;
    continuously forming material passing/fixing parts in a tray plate by punching the tray plate with the punching part and advancing the tray plate by one pitch whenever the upper mold is lifted;
    introducing a material plate to upper sides of the material passing/fixing parts whenever the upper mold is lifted;
    repeatedly cutting the material plate with the cutting/pressing part to form individual cut materials,
    pressing the cut materials into the material passing/fixing parts with the pressing part;
    separating the material passing/fixing parts with respective pressed materials from the tray plate; and
    extracting the separated parts with the extraction part,
    wherein each material passing/fixing part comprises:
    a central hole; and
    one or more passing/fixing holes that are formed on opposing sides of the central hole such that the cut materials pass through the passing/fixing holes and are fixed to the passing/fixing holes when the cut materials are pressed.

2. The method of claim 1, wherein deformation preventing holes that extend along a lengthwise direction of the tray plate to prevent deformation of the tray plate are formed on the opposing sides of the central hole when the tray plate is punched by the punching part.

3. The method of claim 1, wherein cutting the material plate with the cutting/pressing part to form individual cut materials comprises:
    in a state in which the material plate is situated on the material passing/fixing part, cutting the material plate by lowering the upper mold, and seating the cut materials around an upper side of the central hole; and
    moving the material by one pitch after the material is seated.

4. The method of claim 1, wherein the material plate is a metal, and the tray plate is formed of a metal less ductile than the material plate.

5. The method of claim 4, wherein the material plate is aluminum or copper, and the tray plate is formed of iron or stainless steel.

6. An apparatus for forging dissimilar materials, the apparatus comprising:
    a press having upper and lower molds;
    a tray plate supply unit that advances a tray plate by one pitch at a time;
    punching parts that are provided on the upper and lower molds to continuously form material passing/fixing parts in the tray plate;
    a material plate supply unit that is provided in front of the press to supply a material plate to the material passing/fixing parts;
    cutting/pressing parts that are provided in the upper and lower molds adjacent to the punching parts to repeatedly cut the material plate introduced to upper sides of the material passing/fixing parts and fix the cut materials to the material passing/fixing parts after pressing the materials;
    pressing parts that are provided in the upper and lower molds adjacent to the cutting/pressing parts to press the cut materials; and
    extraction parts that are provided in the upper and lower molds adjacent to the pressing parts to separate and extract the formed materials.

7. The apparatus of claim 6, wherein the press further comprises:
    an elevation guide part that supplies the tray plate such that the tray plate is elevated to be spaced apart from an upper surface of the lower mold.

8. The apparatus of claim 7, wherein the elevation guide part comprises:
    a plurality of elevation guide rolls which are disposed on front and rear sides of the lower mold to be spaced apart from each other; and
    a plurality of springs respectively disposed between the lower mold and each elevation guide roll, wherein the springs elevate the tray plate above the lower mold when the springs are in an extended orientation.

9. The apparatus of claim 6, wherein each of the cutting/pressing parts comprises:
    a material cutting part that cuts the material plate when the upper mold is lowered; and
    a material pressing/fixing part configured to press front and rear sides of the cut material and fix the cut material to passing/fixing holes formed on the front and rear sides of the material passing/fixing part after passing the cut material through the passing/fixing holes.

10. The apparatus of claim 6, wherein each of the pressing parts comprises:
    one or more first pressing parts that are provided on one side of the pressing part to form the front, rear, and upper sides of the cut material;
    a connection plate cutting part that is provided on an opposite side of the first pressing parts to connect the material passing/fixing parts of the tray plate; and
    one or more second pressing parts that are provided adjacent to the connection plate cutting part to press opposite sides of the cut material.

11. The apparatus of claim 10, wherein the first pressing part or the second pressing part comprises:

a lower mold part that is inserted into the lower mold to form a forming part, into which the material is inserted, therein;

a discharge mold that is provided in the interior of the forming part to be elevated;

an elevation pin that is provided in the lower mold that is situated below the discharge mold to pass through the lower mold and push a lower end of the discharge mold upwards;

an elevation plate that is provided in the interior of the lower mold to be elevated while being attached to a lower side of the elevation pin and to normally push the elevation pins upwards by one or more springs arranged below the elevation plate, wherein the apparatus further comprises an elevation plate striking unit that strikes a lower side of the elevation plate through driving of a motor to separate the material inserted into the forming part upwards.

12. The apparatus of claim 11, wherein the elevation plate striking unit comprises:

a striking elevation pin which passes through the one or more spring and protrudes from a lower side of the lower mold;

a striking plate that is provided below the striking elevation pin to be horizontally attached to the striking elevation pin such that the striking plate is elevated through a guide shaft around the striking plate;

a spring that is resiliently installed in the striking elevation pin to be disposed between a lower surface of the lower mold and an upper side of the striking plate; and a striking part that strikes a lower surface of the striking plate through driving of a motor.

13. The apparatus of claim 10, wherein at least one pressing part of the first and second pressing parts further comprises:

a material forming/demolding part configured to finally press the material and demold the material from the lower mold upwards by lifting the formed material using a spring.

14. The apparatus of claim 13, wherein the material forming/demolding part comprises:

a first material demolding part that is provided on one side of the material forming/demolding part to separate and extract the material while forming front and rear sides of the material; and a second material demolding part that is provided adjacent to the first material demolding part to separate and extract the material while forming opposite sides of the material.

15. The apparatus of claim 14, wherein the first material demolding part comprises:

a material pushing mold that is provided in the upper mold;

a mold insertion groove that is defined in the lower mold that is situated below the material pushing mold by front and rear inclined surfaces such that front and rear sides of an upper portion thereof is wide and front and rear sides of a lower portion thereof is narrow;

front and rear elevation molds that are inserted into front and rear sides of the mold insertion groove and have attachment inclined surfaces adjacent to the front and rear inclined surfaces on each of the front and rear elevation molds;

a central mold that is provided between the front and rear elevation molds;

a plurality of elevation pins that are formed at a lower portion of the mold insertion groove to pass through the mold insertion groove to push lower sides of the front and rear elevation molds and the central mold; and an elevation plate that is attached to lower sides of the elevation pins to normally push the elevation pins upwards using one or more springs.

16. The apparatus of claim 14, wherein the second material demolding part comprises:

a material pushing mold that is provided in the upper mold;

a forming mold insertion groove that is defined in the lower mold that is situated below the material pushing mold by opposite inclined surfaces such that sides of an upper portion thereof are wide and sides of a lower portion thereof are narrow;

opposite elevation molds that are inserted into opposite sides of the forming mold insertion groove, have attachment inclined surfaces that are adjacent to front and rear inclined surfaces;

a central mold that is provided between the opposite elevation molds;

a plurality of elevation pins that are formed at a lower portion of the forming mold insertion groove to pass through the mold insertion groove to push lower sides of the opposite elevation molds and the central mold; and an elevation plate that is attached to lower sides of the elevation pins to normally push the elevation pins upwards using one or more springs.

17. The apparatus of claim 6, wherein each of the extraction parts comprises:

a circumference cutting part that partially cuts a circumference of the material that has been pressed through lowering of the upper mold; and an extraction/discharge part that is provided adjacent to the circumference cutting part to separate and cut the material that has been finished by lowering the upper mold and discharging the material to a lower side.

18. The apparatus of claim 17, wherein the circumference cutting part comprises:

a lower mold part that is inserted into the lower mold to form a forming part into which the material is inserted;

a discharge mold that is provided in the interior of the forming part to be elevated;

an elevation pin that is provided in the lower mold that is situated below the discharge mold to pass through the lower mold and push a lower end of the discharge mold upwards;

an elevation plate that is provided in the interior of the lower mold to be elevated while being attached to a lower side of the elevation pin and to normally push the elevation pins upwards by one more springs arranged below the elevation plate, and wherein the apparatus further comprises an elevation plate striking unit that strikes a lower side of the elevation plate by driving a motor to separate the material inserted into the forming part upwards.

19. The apparatus of claim 18, wherein the elevation plate striking unit comprises:

a striking elevation pin which passes through the one or more spring and protrudes from a lower side of the lower mold;

a striking plate that is provided below the striking elevation pin to be horizontally attached to the striking elevation pin such that the striking plate is elevated through a guide shaft around the striking plate;

a spring that is resiliently installed in the striking elevation pin to be disposed between a lower surface of the lower mold and an upper side of the striking plate; and a striking part that strikes a lower surface of the striking plate through driving of a motor.

20. The apparatus of claim 19, wherein the striking part comprises:

a working link a center of which is fixed to the press through a hinge shaft such that the striking part is rotated about the hinge shaft, one end of which is attached to a lower side of the striking plate, and an opposite end of which is provided with a rotary roll; and a rotary cam plate that is connected to a rotary shaft of the motor to be rotated and in which the rotary roll is attached to a circumference of the rotary cam plate, such that the striking plate is stricken by changing an angle of the working link.

21. The apparatus of claim 6, wherein the material plate is a metal and the tray plate is formed of a metal that is less ductile than the material plate.

22. The apparatus of claim 21, wherein the material plate is aluminum or copper, and the tray plate is formed of iron or stainless steel.

* * * * *